(No Model.)   J. O'GRADY.   2 Sheets—Sheet 2.
WEIGHING SCALE.
No. 304,546.   Patented Sept. 2, 1884.
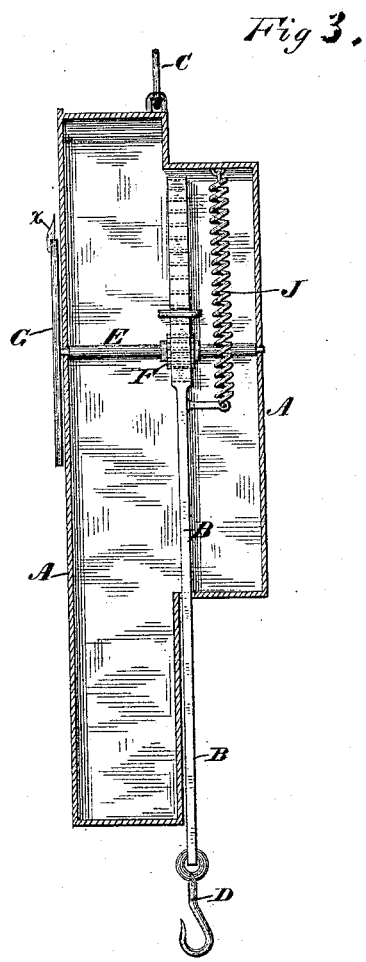
WITNESSES:
Harry King
Howard Edmonds
INVENTOR:
James O'Grady
By F. C. Soules
Associate Attorney

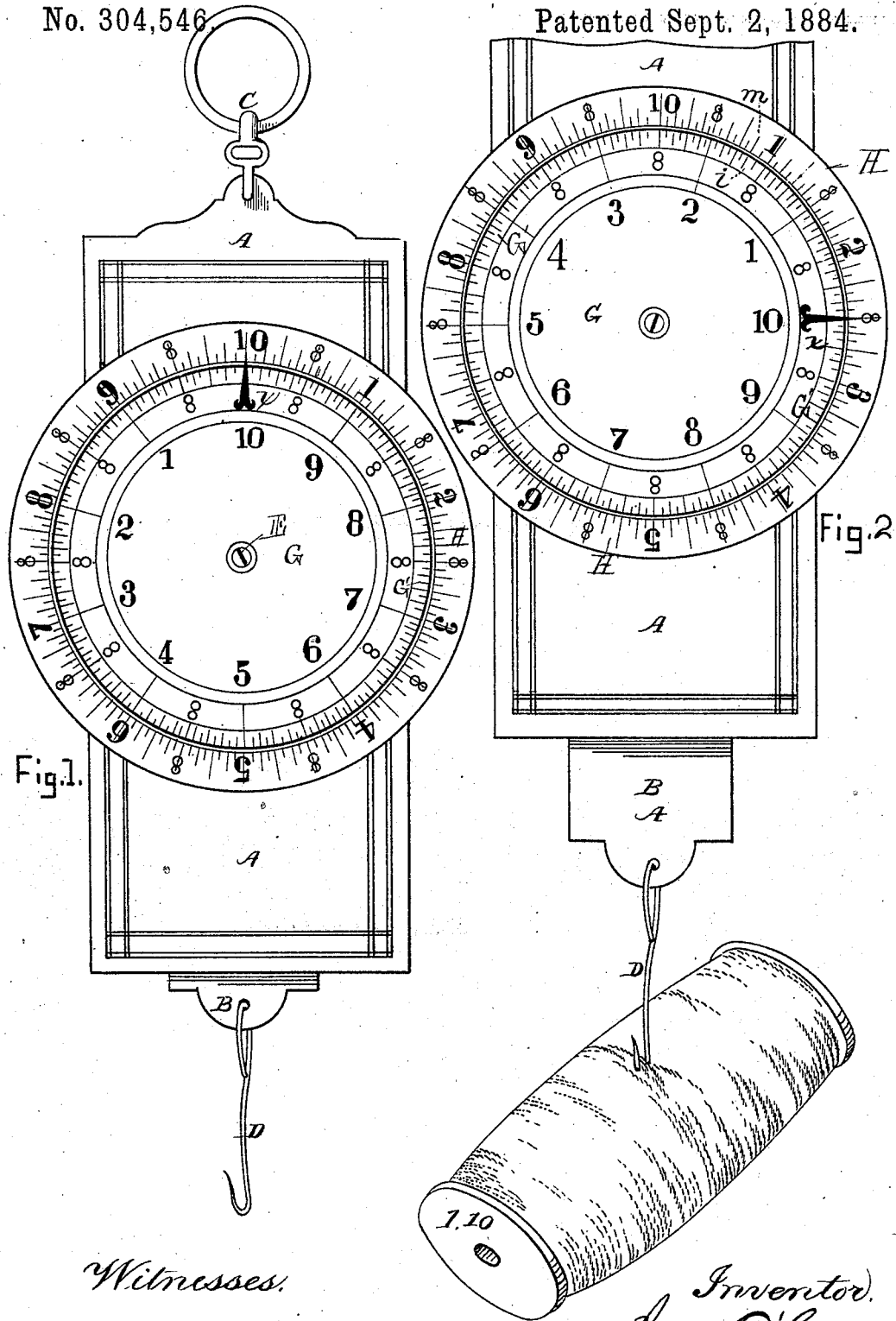

UNITED STATES PATENT OFFICE.

JAMES O'GRADY, OF NEWTON, MASSACHUSETTS, ASSIGNOR TO HIMSELF AND EDWIN FARNELL, OF SAME PLACE.

WEIGHING-SCALE.

SPECIFICATION forming part of Letters Patent No. 304,546, dated September 2, 1884.

Application filed March 5, 1884. (No model.)

*To all whom it may concern:*

Be it known that I, JAMES O'GRADY, a subject of the Queen of Great Britain, residing at Newton, in the county of Middlesex, State of Massachusetts, have invented a certain new and useful Improvement in Weighing-Scales, of which the following is a description, sufficiently full, clear, and exact to enable any person skilled in the art or science to which said invention appertains to make and use the same, reference being had to the accompanying drawings, forming a part of this specification, in which—

Figure 1 is a front elevation of my improved scale, and Fig. 2 a like view showing it in use. Fig. 3 is a vertical transverse section through this improved scale.

Like letters of reference indicate corresponding parts in the different figures of the drawings.

My invention relates to that class of weighing-scales which are provided with dials and indexes; and it consists in a novel construction and arrangement of the parts, as hereinafter more fully set forth and claimed, by which a more effective device of this character is produced than is now in ordinary use.

In weighing articles of value, where tare has to be deducted and great accuracy is desirable, mistakes frequently occur, which occasion much annoyance and delay, and sometimes result in a very considerable loss. This is more especially the case in worsted, silk, and other manufactories where the yarn, &c., is weighed on the bobbins before being sold or used, the work being usually performed by boys, who are often careless or have not sufficient arithmetical knowledge to enable them to make the necessary calculations rapidly and accurately. The mere physical labor of subtracting the tare from the gross weight at each weighing of a bobbin is also, in the aggregate, very large, and consumes much time when properly performed.

My invention is designed to obviate these and other difficulties and objections by furnishing a scale which instantly and accurately denotes both the net and gross weight of any article weighed thereon where the tare has been previously ascertained; and to that end I make use of means which will be readily understood by all conversant with such matters from the following explanation, its extreme simplicity rendering an elaborate description unnecessary.

In the drawings, A represents the body or case; B, the bar; C, the supporting-ring, and D the hook. The bar B is adapted to slide vertically within the case in the usual manner, a stout coil-spring, J, being connected to the bar and to the case and acting contractively to keep said bar within the case. An arbor or shaft, E, is journaled in the case at right angles to the bar in proper bearings, and firmly attached to its outer end there is a disk or dial, G, provided with the index or finger $x$. The shaft is provided on the interior of the case with a pinion, F, which engages a toothed rack on the bar B, and so arranged that when said bar is drawn outwardly from the case the disk G will be turned or revolved to the right, and when retracted by the spring or drawn inwardly it will be revolved to the left. The revolving dial or disk G is provided on its face, near its periphery, with an annular scale, G', divided into ten equal sections, numbered from 1 to 10, respectively, from right to left, being the reverse of the usual order, each of these sections being divided into sixteen equal parts, the sections and their divisions representing, respectively, pounds and ounces avoirdupois weight. Disposed around the disk or dial G, and firmly attached to the face of the case A, there is an auxiliary annular scale, H, divided into ten equal sections numbered, respectively, from 1 to 10 in regular order, or from left to right, each of these sections being divided to correspond with those on the disk G into sixteen equal parts, the sections and their divisions representing pounds and ounces avoirdupois. For convenience, the pounds or sections representing pounds on either scale are divided into half-pounds, the half-pound division-line being marked with the figure 8, standing for eight ounces. The quarter, eighth, and sixteenth pound marks may also be indicated by proper numerals, if desired.

In the use of my improvement the scale is suspended by the ring C, and the article to be weighed attached to the hook D, as usual, the gross weight being indicated on the auxiliary scale H by the index $x$, which is fixed to and turns with the dial G, in a manner which will be readily obvious without a more explicit description.

This invention is designed for weighing articles on which the amount of tare is already known, and the dial G, with its graduations, serves as a subtracting device to indicate the net weight after the gross weight is ascertained by the scale. After the article is weighed and the gross weight indicated by the finger $x$ on the scale H, the tare being known, the net weight will be indicated on the dial H at a point opposite the graduation of the scale G, which indicates the known amount of tare.

In Fig. 2 this improved scale is represented as in use weighing a bobbin filled with yarn. The known weight of the bobbin is one pound and ten ounces, which in this case constitutes the tare. The gross weight of the article, including the bobbin and the yarn, is indicated on the scale H by the finger $x$, which turns with the dial G. The scale on the dial G being arranged in reverse order to that of the scale on the dial H, it is only necessary to note the point on the dial G, which indicates the weight of the tare, which in this case is at $i$, and the net weight will be indicated on the dial H at a point, $m$, opposite the point $i$ on the dial G. In case either the gross weight or tare of any article is more than ten pounds, the numbers above ten on the respective scales are added to ten—for instance, if the filled bobbin shown in Fig. 2 weighed twelve pounds and eight ounces, the scale as it stands in Fig. 2 would correctly indicate the gross weight, and if the bobbin itself weighed twelve pounds, the net weight or weight of the yarn would be eight ounces, which it will be observed is the number on scale H opposite figure 2 of the dial G.

It will be obvious that the sections may be divided into twelve or any number of parts, if desired; also, that the invention may be readily adapted to platform and other scales, and I do not, therefore, confine myself to its use with spring-balances or scales exclusively. Neither do I confine myself to having the disk G rotate and the scale H stationary, as the disk may be made stationary.

Having thus explained my invention, what I claim is—

1. The combination, with a weighing mechanism, of a graduated fixed dial, a rotary dial connected to said mechanism and provided with a graduated scale numbered in reverse order to the graduations of the fixed dial, and an index or finger attached to the movable dial, substantially as described.

2. In a weighing scale or balance, the revolving disk G, provided with the index $x$ and with a scale of figures denoting pounds and the fractional parts thereof, said figures being arranged in reverse order, or from right to left, in combination with the auxiliary scale H, substantially as specified.

3. The improved weighing scale or balance herein described, the same consisting of the body A, ring C, bar B, hook D, scale H, arbor E, index $x$, and dial G, having a scale numbered in reverse order, in combination with operative mechanism, substantially as set forth.

JAMES O'GRADY.

Witnesses:
C. A. SHAW,
L. J. WHITE.